Patented Jan. 12, 1943

2,308,222

UNITED STATES PATENT OFFICE 2,308,222

PRODUCTION OF SYNTHETIC DRYING OILS

William T. Walton and Wesley A. Jordan, Chicago, Ill., assignors to The Sherwin-Williams Company, Cleveland, Ohio, a company of Ohio No Drawing. Application December 30, 1939,
Serial No. 311,818

14 Claims. (Cl. 260—411)

A synthetic drying oil comprising one or more poly unsaturated fatty acid radicals, including chains having conjugate double bonds, and one or more fatty acid radicals, including poly unsaturated chains not having such conjugate double bonds, both of said types of acid chains being united with a single glycerol or other polyhydric alcohol radical, has heretofore been produced and certain advantages of such a product have been recognized. See, for instance, United States Patent No. 2,077,371, issued April 13, 1937.

The present invention involves a new process for the manufacture of synthetic drying oils of the character above referred to or analogous drying oils and mixtures of such oils. By means of the present invention, such products may be made by a very simple and easily controlled procedure and by the use of raw materials readily available in any desired quantity. Furthermore, in making the product, a raw material may be employed which does not include more than one double bond in the chain, the second double bond being formed in the preparation of the final product. This raw material may be castor oil, each chain of which includes only one double bond but does include a hydroxyl group.

As a second ingredient, there may be used any suitable drying oil acid which may have two or more double bonds in conjugate or non-conjugate positions, such, for instance, as the acids of linseed oil, soya bean oil, fish oil, perilla oil, etc., where the double bonds are in non-conjugate position, or China-wood oil, oiticica, etc., where the double bonds are in conjugate position.

As the third ingredient, there may be used any polyhydric alcohol having more than three hydroxyl groups, such, for instance, as erythritol, pentaerythritol, mannitol, etc.

The preparation of the product is carried out as a single process but involves two steps, the first of which is the dehydration of the castor oil by the action of the fatty acid, and the second of which is the formation of the double glycerides or mixtures of double glycerides or double esters of other polyhydric alcohols.

The process may be carried out as follows:

Raw castor oil is heated with an unsaturated drying oil fatty acid or mixture of acids at such temperature and for sufficient time until dehydration of the castor oil takes place in accordance with heretofore known principles. The dehydration results in the splitting off of hydroxyl groups and hydrogen from the chains and the formation of a second and conjugate double bond and the liberation of water. The heating of the mixture of castor oil and unsaturated drying oil fatty acid may be for approximately one hour at a temperature of about 585° F. We do not desire to be limited to this particular temperature or length of time as various reactants may require longer or shorter time and higher or lower temperatures. This general method of dehydrating is disclosed in the Brod Patent 2,212,385, although in our process we do not distill off the acid following dehydrating and ester-splitting steps but leave it in the oil.

On completion of the dehydrating reaction, as evidenced by cessation of evolution of steam from the mass, we may or may not add more free fatty acid to the mixture, depending upon the amount originally added. The addition is made in accordance with the desires regarding the constitution of the final product and is not essential to the process. The mixture is permitted to cool to a limited extent and the polyhydric alcohol, preferably having a higher boiling point and more hydroxyl groups than glycerine, is added to the mixture of dehydrated castor oil and fatty acid prepared as above described. The polyhydric alcohol added is preferably pentaerythritol and the degree of cooling is only such as will permit the chosen polyhydric alcohol to be added without excessive evaporation losses. In the case of pentaerythritol, the cooling may be to about 500° F. to 525° F. at which temperature it may be added without difficulty.

After adding the polyhydric alcohol, the temperature of the mixture is maintained at that required for esterification of the free fatty acid in the mixture with the polyhydric alcohol. In order to expedite the esterification and to improve the quality of the final product, a stream of superheated steam is passed through the mass as is set forth more fully in a companion application, Serial No. 311,819, filed on even date herewith. When the acid number of the product drops to 15, it is preferable to stop the passage of steam and begin the passage of inert gas, for example, carbon dioxide. When the acid number falls to 10 or below, the reaction may be considered as complete and the stream of inert gas may be stopped and the oil permitted to cool.

As the castor oil is a glyceride, and as the polyhydric alcohol which was added was a different one from the glycerol of the castor oil, and as the unsaturated fatty acid which was added was different from the fatty acid of the castor oil, there is produced a mixture of two fatty acid polyhydric alcohol esters. The fatty acid radicals exchange to a stable equilibrium and the mixture includes the poly fatty acid esters of glycerol as well as the poly fatty acid esters of the other polyhydric alcohol, namely, pentaerythritol. Each of said esters is characterized by fatty acid chains having double bonds in conjugate position and also by fatty acid chains with double bonds in non-conjugate position if that was the characteristic of the added fatty acid. For example, if the starting raw materials include castor oil, free fatty acids fractionated from fish oil acids and having a high iodine number, such as the commercial product known as Neofat #19, and the free acid is esterified after the first heating by pentaerythritol, the product will be a mixture of glycerol ester and pentaerythritol ester of the dehydrated castor oil fatty acids, each of said esters having at least one chain with two double bonds in conjugate position and at least one chain with the double bonds in isolated position. There may be present also simple glycerol esters of each acid and simple pentaerythritol esters of each acid. Neofat #19 is a mixture of acids derived from fish oil and is composed essentially of poly-unsaturated non-conjugated aliphatic acids having from 20 to 22 carbon atoms in the chain and containing smaller amounts of other fatty acids such as oleic, linoleic and linolenic acids.

As previously noted, it is not necessary that the poly unsaturated fatty acid which is added have isolated double bonds, but may be a free fatty acid having conjugate double bonds, for instance, that obtained from China-wood oil, oiticica, or the like.

In order to facilitate the esterification, it is preferable that a very small quantity of a suitable catalyst be employed. We have found that approximately .1 part of lime is desirable but we do not wish to be limited to the use of this material or to such proportion.

The following specific examples may indicate more clearly the different ways in which the invention may be carried out:

*Example I*

| | Parts |
|---|---|
| Raw castor oil | 93.2 |
| Neofat #19 | 180.0 |
| Pentaerythritol | 22.4 |
| Calcium oxide | .1 |

Mix the raw castor oil and 90 parts of Neofat #19 and heat as rapidly as possible to 585° F. Hold at 585° F. for one hour. Add the other 90 parts of Neofat #19. Let cool to 525° F. Add the pentaerythritol and calcium oxide. Pass superheated steam through the batch and hold temperature at 470° F. for one hour. When the acid number drops to 15 or below at the end of the hour stop the steaming and blow carbon dioxide through the batch until the acid value drops to 10 or below. Stop heating and stop blowing with carbon dioxide. Let the oil cool.

*Example II*

| | Parts |
|---|---|
| Raw castor oil | 93.2 |
| Neofat #19 | 90.0 |
| Pentaerythritol | 11.1 |
| Calcium oxide | .1 |

Mix the castor oil and Neofat #19 and heat to 585° F. as rapidly as possible. Hold 585° F. for one hour. Let cool to 525° F. Add pentaerythritol and calcium oxide and proceed as in Example I.

*Example III*

| | Parts |
|---|---|
| Raw castor oil | 93.2 |
| Neofat #19 | 90.0 |
| Linseed fatty acids | 84.0 |
| Pentaerythritol | 22.5 |
| Calcium oxide | .1 |

Mix the castor oil and Neofat #19 and proceed as in Example I.

*Example IV*

| | Parts |
|---|---|
| Raw castor oil | 93.2 |
| Neofat #19 | 180.0 |
| Glycerol | 18.4 |
| Calcium oxide | .1 |

The castor oil may be first dehydrated as follows:

Mix the raw castor oil with 90.0 parts of Neofat #19 and heat to 585° F. as rapidly as possible. This usually takes ¾ to 1 hour in plant practice. Hold the temperature at 585° F. for 1 hour. Blanket this operation with $CO_2$. In this step, the dehydration is accomplished. Considerable boiling of the mixture occurs emitting water vapor and decomposition products.

A mixture of mono and di-glyceride may be prepared as follows:

In a second kettle equipped with a cover having a small stack and a mechanical agitator, mix 90.0 parts of Neofat #19, 18.4 parts of glycerol, and 0.1 part of calcium oxide. Agitate this mixture, blanket with $CO_2$ and heat to 330° F. in ½ hour. Hold at 330° F. ½ hour. In the next hour raise the temperature to 375° F. The acid value should then be 50 or less. In actual plant practice it was found to be 37.2.

The synthetic drying oil may then be prepared as follows:

Add the mixture of mono and di-glyceride to the dehydrated castor mixture. In the bottom of this combined mixture, place a perforated steam coil. Blanket with $CO_2$. Agitate this mixture with superheated steam. Heat the combined mixture to 470° F. Blow the mixture with superheated steam at 470° F. until the acid value is 15 or less. An equilibrium is usually reached at 11–12 under the said conditions. In plant practice we have found that this step takes from ½ to ¾ hour. However, it is essential that steaming be continued so that the total time consumed is at least 1 to 1½ hours. The steam not only supplies the agitation for esterification, but it removes decomposition products and unsaponifiable matter. The introduction of steam retards the formation of poly-glycerols and anhydrides and favors the formation of the ester.

Having reached an acid value of 15 or less and having steamed for 1 hour or longer, the steam is replaced with $CO_2$. The mixture is blown at 470° F. until the acid value reaches 6–7. The kettle is removed from the fire and blowing is continued until the temperature reaches 350° F. The acid value is now 2–3.

In working the process we are not confined to the raw material as shown in the examples, but may use any free drying oil fatty acid that we choose or any polyhydroxy alcohol having three or more hydroxy groups that we choose. The above are simply cited as examples.

The pentaerythritol esters are faster drying than those of the glycerol and films formed from said esters are more resistant to water and alkali. The new product comprising the mixture of esters and produced as above described possesses important advantages over any mixture of esters of glycerine and pentaerythritol separately produced and then mixed. The reason is not entirely clear but it is noted that the mixture is characterized by the fact that it remains homogeneous at all viscosities, whereas any attempt to prepare the mixture by mixing separately prepared esters exhibits a tendency toward selective and non-homogeneous selective polymerization in the preparation of a varnish. Possibly this may be due to the fact that by the interchange of fatty acid radicals and the coupling of them with the two different polyhydric alcohols, the mixture may contain a very large number of different esters which are difficult if not impossible to separate.

Having thus described our invention, what we claim as new and desire to secure by Letters Patent is:

1. The process of forming a synthetic drying oil which includes heating castor oil with a poly-unsaturated free fatty acid of a drying oil to effect removal of hydroxyl groups and the formation of a second double bond in the chains of the castor oil, and thereafter esterifying the free fatty acid present with the dehydrated oil after the dehydration, by the action of a polyhydric alcohol having more than three hydroxyls.

2. The process of forming a synthetic drying oil which includes heating castor oil with a free fatty acid having non-conjugate double bonds to thereby effect dehydration of the castor oil, thereafter adding a polyhydric alcohol having more than three hydroxyls, and esterifying the free fatty acid present.

3. The process of forming a mixture of fatty acid esters which includes heating castor oil with a free fatty acid having non-conjugate double bonds, thereafter adding pentaerythritol and esterifying the free fatty acid present.

4. The process which consists in heating castor oil with a poly-unsaturated free fatty acid of a drying oil, adding a polyhydric alcohol having more than three hydroxyls, and maintaining the mixture in a heated condition to effect esterification of the free fatty acid present after the first heating.

5. The process which consists in heating castor oil with a poly-unsaturated free fatty acid of a drying oil, adding pentaerythritol and maintaining the mixture in a heated condition to effect esterification of the free fatty acid present after the first heating.

6. The method of forming mixed esters of fatty acids having conjugate double bonds and fatty acids having non-conjugate double bonds and polyhydric alcohols having different numbers of hydroxyl groups, which consists in heating castor oil with a fatty acid having non-conjugate double bonds, and thereafter heating the mixture at a lower temperature with a polyhydric alcohol having more than three hydroxyls.

7. The process which consists in heating castor oil and poly-unsaturated non-conjugate higher fatty acids at a temperature of about 585° F. for about an hour, thereafter adding a polyhydric alcohol having more than three hydroxyls, and holding the temperature at about 470° F. for about an hour, thereafter adding a polyhydric acid.

8. The process which consists in heating castor oil with a mixture of acids derived from fish oil and composed essentially of poly-unsaturated non-conjugated aliphatic acids having from 20 to 22 carbon atoms in the chain, and containing smaller amounts of other fatty acids such as oleic, linoleic and linolenic acids, to effect dehydration of the castor oil, and thereafter adding pentaerythritol and a free fatty acid having non-conjugate double bonds, and maintaining the heating at a lower temperature to effect esterification.

9. The process of making a synthetic drying oil which includes esterifying the hydroxyl groups of castor oil with a poly-unsaturated non-conjugate higher fatty acid, splitting off the esterifying acid, thereby forming dehydrated castor oil, and saponifying said acid with a polyhydric alcohol having more than three double bonds and in the presence of the dehydrated castor oil.

10. The process of making a synthetic drying oil which includes esterifying the hydroxyl groups of castor oil with a non-conjugated poly-unsaturated higher fatty acid, splitting off the esterifying acid, thereby forming dehydrated castor oil, and esterifying said acid with pentaerythritol and in the presence of the dehydrated castor oil.

11. A synthetic drying oil prepared by the process of claim 1 and consisting essentially of a mixture of mixed esters of glycerol and a polyhydric alcohol having more than three hydroxyl groups, which are esterified with the mixed fatty acids of dehydrated castor oil and a poly-unsaturated free fatty acid of a drying oil.

12. A synthetic drying oil prepared by the process of claim 5 and consisting essentially of a mixture of mixed esters of glycerol and pentaerythritol, which are esterified with the mixed fatty acids of dehydrated castor oil and a poly-unsaturated free fatty acid of a drying oil.

13. A synthetic drying oil prepared by the process of claim 2 and consisting essentially of a mixture of mixed esters of glycerol and a polyhydric alcohol having more than three hydroxyl groups, which are esterified with the mixed fatty acids of dehydrated castor oil and a fatty acid having non-conjugated double bonds.

14. A synthetic drying oil prepared by the process of claim 3 and consisting essentially of a mixture of mixed esters of glycerol and pentaerythritol, which are esterified with the mixed fatty acids of dehydrated castor oil and a fatty acid having non-conjugated double bonds.

WILLIAM T. WALTON.
WESLEY A. JORDAN.